V. F. REICH.
DOUBLE ACTING ELASTIC SHACKLE.
APPLICATION FILED OCT. 1, 1919.
1,373,449.
Patented Apr. 5, 1921.
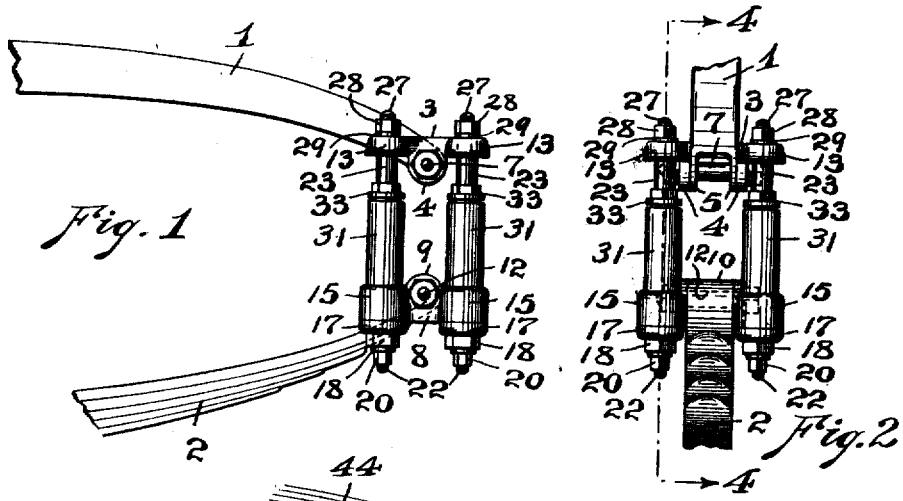
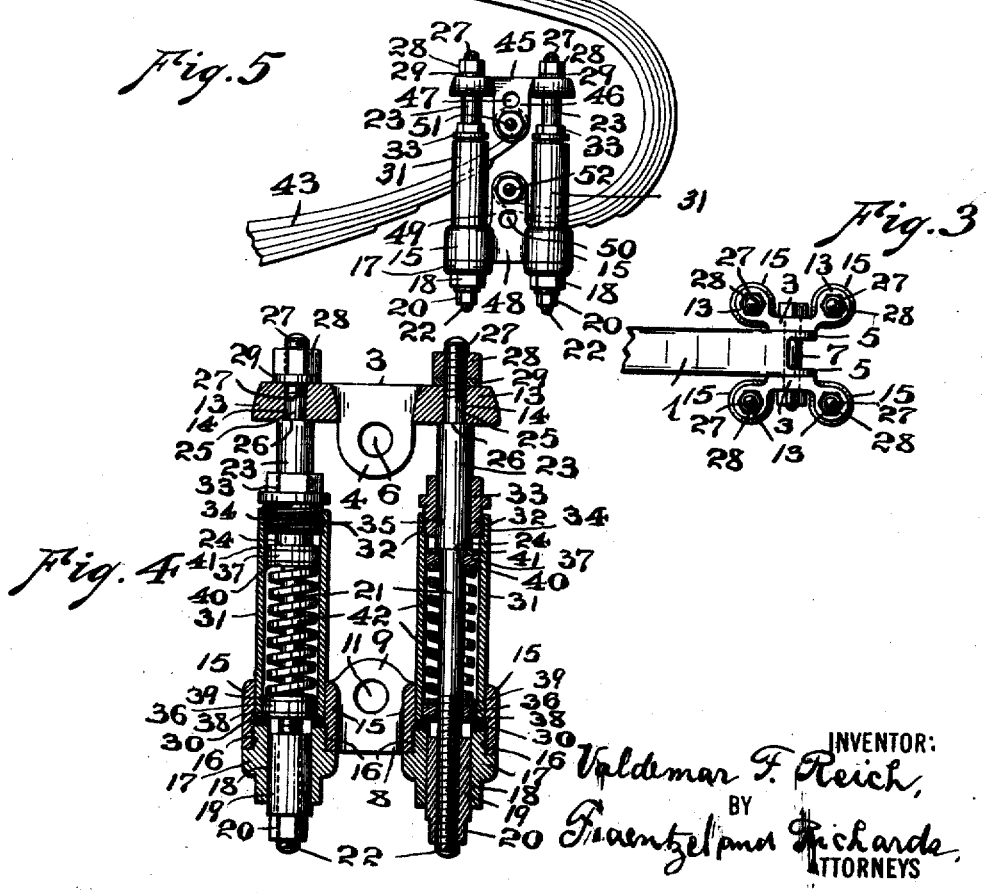
INVENTOR:
Valdemar F. Reich,
BY Fraentzel and Richards
ATTORNEYS

UNITED STATES PATENT OFFICE.

VALDEMAR F. REICH, OF PITTSBURGH, PENNSYLVANIA, ASSIGNOR TO NATHANIEL ELIN, OF NEWARK, NEW JERSEY.

DOUBLE-ACTING ELASTIC SHACKLE.

1,373,449.     Specification of Letters Patent.     Patented Apr. 5, 1921.

Application filed October 1, 1919. Serial No. 327,770.

*To all whom it may concern:*

Be it known that I, VALDEMAR F. REICH, a citizen of the United States, residing at Pittsburgh, in the county of Allegheny and State of Pennsylvania, have invented certain new and useful Improvements in Double-Acting Elastic Shackles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in the art pertaining to shackles for connecting the ends of the springs of vehicles, and especially of automobiles; and, the invention has reference, more particularly, to a novel construction of double acting elastic shackle which acts not only as a shock-absorbing means for checking the violent reactions of the usual vehicle springs, but acts also in the opposite direction from that which is usual with the general constructions of shock-absorbers, the shackle acting also upon the rebound.

The present invention, therefore, has for its principal objects to provide a novel and simply constructed double acting elastic shock-absorbing means, preferably in the form of a shackle for connecting the end-portions of vehicle springs, the loops or eyes of the oppositely disposed spring-members being connected by means of cushioning springs which are free to act both ways, under compression as well as tension, thereby acting in a manner similar to the usual shock-absorbers, but at the same time taking up the shocks upon the rebound.

Thus, the invention while having for its main object, primarily, the production of a resilient shackle-construction, also has for its further object a shock-absorbing means or device which acts both under compression and tension, is of a more compact and efficient construction, has a greater action of the shock-absorbing springs and has a wide range of elasticity.

Other objects of the present invention not at this time more particularly enumerated will be clearly understood from the following detailed description of the present invention.

With the various objects of the present invention in view, the said invention consists, primarily, in the novel double-acting elastic shackle hereinafter set forth; and, the invention consists, furthermore, in the novel arrangements and combinations of the various devices and parts, as well as in the detail of the construction of the said parts, all of which will be more fully described in the following specification, and then finally embodied in the clauses of the claims which are appended to and which form an essential part of the said specification. The invention is clearly illustrated in the accompanying drawings, in which:—

Figure 1 is a side view of fragmentary portions of a semi-elliptical spring, the end-portions of the members thereof being connected by means of a double-acting elastic shackle, shown in side elevation, and made according to and embodying the principles of the present invention; Fig. 2 is an end elevation of the part represented in said Fig. 1; and Fig. 3 is a plan or top view of the same.

Fig. 4 is an enlarged vertical sectional representation of the device, said section being taken on line 4—4 in said Fig. 2.

Fig. 5 is a side view of fragmentary portions of a three-quarter spring, the end-portions of the members thereof being connected by means of a double-acting elastic shackle, shown in side-elevation, and illustrating another embodiment of the principles of the present invention.

Similar characters of reference are employed in the said above described views, to indicate corresponding parts.

Referring now to Figs. 1 to 4 inclusive, the reference-characters 1 and 2 indicate, respectively, fragmentary portions of the chassis or body-members of the vehicle, and the usual spring-member, the same providing what is termed in the art as the semi-elliptic spring.

The novel construction of double-acting elastic shackle comprises a pair of upper hanger-irons or supporting members or elements, as 3, provided with downwardly extending ears or lugs 4, adapted to be located against the outer faces of a pair of ears or lugs 5 with which the chassis or body-member 1 is provided. As shown more particularly in Fig. 4 of the drawings, the said ears or lugs 4 are provided with holes or perforations 6, to be alined with the correspondingly located holes or perforations, in the lugs or ears 5, (not shown in the drawings,) for the reception of a shackle-bolt 7 of any usual construction.

Similarly, a pair of lower hanger irons or supporting members or elements, as 8, provided with upwardly extending ears or lugs 9, are located against the outer faces of the eye-portion 10 of the spring-member 2, the said lugs or ears 9 being likewise provided with holes or perforations 11 for the reception of a shackle-bolt 12 of any usual construction.

Extending laterally from said upper hanger-irons or supporting members or elements 3 are lugs or ears 13, the same being provided with holes or perforations 14. Similarly, extending laterally from said lower hanger-irons or supporting members or elements 8 are lugs or ears 15, in the form of tubular bosses, which are internally screw-threaded, as at 16, in the manner indicated in Fig. 4 of the drawings.

Screwed into the lower screw-threaded portions 16 of each boss is a nut 17 provided with a smooth bore 18, providing a guide for an internally screw-threaded sleeve 19, having a nut-shaped portion 20 for screwing the same upon the lower screw-threaded shank-portion 22 of a stem 21. The said stems 21 are provided near their upper portions with enlarged parts, as 23; providing with said stems 21 off-sets or shoulders 24, and extending in upward directions from said enlarged parts 23, are reduced shank-portions 25, forming with said enlarged parts 23, off-sets or shoulders 26, said shank-portions 25 being further provided with screw-threads 27 and with nuts 28 and washers 29 for firmly securing the upper supporting hanger-irons or members or elements 3 upon said off-sets or shoulders 26 in the manner clearly illustrated in Fig. 4 of the drawing.

Within each boss 15, and resting upon each nut 17 screwed into the same, is a packing ring 30, and supported within each boss 15, with its lower end resting upon the packing ring 30, is a tubular member or cylinder 31. The upper end-portion of each tubular member or cylinder 31 is internally screw-threaded, as at 32, for the reception of the screw-threaded part 34 of a nut-shaped member 33. These members 33 are also provided with smooth bores 35 for their slidable dispositions upon the enlarged parts 23 of the stems 21. Suitably disposed upon each stem 21, within each cylinder 31, are guide-disks or members 36 and 37, the disk or member 36 being interdisposed between a pair of packing rings 38 and 39, and the disk or member 37 being similarly interdisposed between a pair of packing rings 40 and 41. Encircling each stem 21, with its respective end-portions bearing upon the respective disks 39 and 40, is a helical spring 42, the said springs, as will be evident, being properly adjusted and brought under compression, by screwing up the sleeves 19 and the nut-shaped members 33 to the degree desired.

Referring now to the modified form of double-acting elastic shackle illustrated in Fig. 5 of the drawings, and which is more particularly adapted with the members 43 and 44 of the three-quarter elliptic spring, the shackle comprises a pair of upper hanger-irons or supporting members 45, provided with downwardly extending ears or lugs 46, formed with a plurality of bolt-receiving perforations 47, and a pair of lower hanger-irons or supporting members 48, likewise provided with upwardly extending ears or lugs 49, formed with a plurality of bolt-receiving perforations 50, for the adjustable disposition of the said supporting members with relation to the respective shackle bolts 51 and 52 of the spring-members 43 and 44.

In all other respects, the general arrangement and construction of the several devices and parts of the said double-acting shackle represented in said Fig. 5 is the same as that herein-above described in connection with the construction shown in said Figs. 1 to 4 inclusive, and any further description of the same is therefore deemed unnecessary.

Briefly, the action of the shock-absorbing device illustrated in Figs. 1, 2 and 4 is as follows:—

When the vehicle is at rest, the various devices and parts of the shock-absorber are in the relative positions, substantially as illustrated in Fig. 4 of the drawings. As soon as the load of the body is increased, by the entrance of one or more passengers, or otherwise, the stems 23 are caused to correspondingly move in a downward direction, causing the disks 37 to move with the stems. The disks 36 being held against downward movement by resting upon the rings 30, which in turn are fixed against movement, by resting upon the ends of the guide-nuts 17, the springs 42 will be brought under compression, as will be clearly evident. The result will be, that when driving over rough roads, the vibratory action is taken up by the reciprocally moving stems and the springs encircling said stems, the stems moving up and down within the lower guide-nuts 17, while the disks 36 and the lower ends of the springs remain fixed.

Now suppose that the wheel drops into a deep rut or depression in the road-bed. In that case, the stems, due to the inertia or momentum of the load, will accordingly move still farther in a downward direction, thereby still further compressing the springs in a downward direction against the lower fixed ends of the springs. Immediately, however, the rebound takes place, that is, the body of the car and its load are forced with great action in an upward direction. The upward movement, however, is counteracted by compression of the springs in the opposite direction from that herein-above mentioned, due to the fact that the rebounding load exerts a pull upon the stems in an upward direction, whereby the sleeves or elements 19, being fixed upon the stems, also move in an upward direction against the disks 36, so that the coils of the springs are now compressed in an upward direction, against the pulling force of the rebounding load, whereby the forcible rebounding action of the vehicle-body and its load are not merely reduced to a minimum, but such violent reaction is overcome by the various devices and parts thereby being permitted to resume their normal relations without undue force, and without any perceptible discomfort to the passengers or possible damage to or breaking of any parts of the vehicle.

Thus, briefly, the device for producing the results stated comprises, mainly a cylinder, a stem extending through the cylinder, and movable in a reciprocating manner through said cylinder, and a single spring encircling said stem, said spring at all times moving under compression in either direction, with the corresponding reciprocatory movements of the stem.

With the arrangements of the devices and parts, when assembled as represented in Fig. 5 of the drawings, the various actions and movements take place in a reverse manner from that herein-above described.

From the foregoing description of the present invention, and from an inspection of the several figures of the drawings, it will clearly be seen that I have devised a compact and simply constructed shock-absorbing means which is easily and quickly attached, the device operating as a double acting elastic shackle, it being understood, that the device in acting both ways, serves to check any violent reaction of the spring-members of the vehicle, the pound of such violent reaction being absorbed by the springs 42, and the recoil being taken up by the same springs acting in the opposite direction.

This arrangement of the springs 42, acting in opposite directions, adds greatly to the efficiency of the shock-absorbing device and constitutes a novel and important improvement over the various forms of shock-absorbing devices now ordinarily in use.

Another point of novelty consists in the arrangement of the shock-absorbing springs upon opposite sides of the end-portions of the spring-members of the vehicle, thus providing a proper balance between the several parts in their assembled relation and producing a better distribution and absorption of the shocks or jars, in either direction; and, finally, the arrangement of the devices and parts, as a whole, being more compact and less clumsy.

Of course I am aware, that some changes may be made in the general arrangements and combinations of the several devices and parts, as well as in the details of the construction of the same, without departing from the scope of the present invention, as set forth in the foregoing specification, and as defined in the clauses of the claims which are appended thereto. Hence, I do not limit my present invention to the exact arrangements and combinations of the several devices and parts as described in the said specification, nor do I confine myself to the exact details of the construction of the said parts, as illustrated in the accompanying drawings.

I claim:

1. A shock-absorbing means comprising a cylinder, stem-receiving guides connected with the respective ends of said cylinder, a load-carrying stem movable through said cylinder and said guides in a reciprocatory manner, a spring encircling said stem, means mounted upon one portion of the stem and moving therewith for compression of the spring in one direction with a corresponding movement of the stem, and means mounted upon another portion of said stem and also moving therewith for compression of the spring in an opposite direction with the corresponding movement of the stem.

2. A shock-absorbing means comprising a cylinder, stem-receiving guides connected with the respective ends of said cylinder, a load-carrying stem movable through said cylinder and said guides in a reciprocatory manner, a spring encircling said stem, a disk in engagement with one end of said spring, said disk being mounted upon one portion of the stem and moving therewith for compression of the spring in one direction with a corresponding movement of the stem, and another disk in engagement with the other end of said spring, said last-mentioned disk also being mounted upon another portion of the stem and also moving therewith for compression of the spring in an opposite direction with the corresponding movement of the stem.

3. A shock-absorbing means comprising a cylinder, a rod extending longitudinally through said cylinder, said rod being capable of reciprocatory movement, a single spring encircling said rod, said spring being adapted to receive pressure at one end due to a load whereby the spring is compressed in one direction and also to receive vibratory action while the opposite end of the spring remains fixed, and means carried by said cylinder and coöperating with the other end of said spring to compress said spring in an opposite direction, but at the same time permitting said spring and rod to assume their initial positions with relation to the cylinder.

4. A shock-absorbing means comprising a cylinder having fixed end-members providing guides, a stem extending through said cylinder and having portions movably disposed in said guides, said rod being capable of reciprocatory movement, a spring-engaging means upon said stem, initially held against movement within said cylinder in one direction by one of said end-members of the cylinder, a second spring-engaging means upon said stem capable of initial movement with said stem when carrying a load, but at the same time capable of reciprocatory movement with said stem, and a spring encircling said stem between the said spring-engaging means.

5. A shock-absorbing means comprising a cylinder, a load carrying stem, guiding means connected with the respective ends of said cylinder, said stem extending through said cylinder and having portions slidably mounted within said guiding means, said rod being capable of reciprocatory movement, a pair of disks loosely mounted upon the stem, and a spring encircling said stem between the disks thereon, said disks being adapted to move with said stem for respectively compressing the spring in either direction during corresponding reciprocatory movements of the stem.

6. A shock-absorber for vehicles comprising oppositely located means for pivotal attachment to the end-portions of the respective spring-members of the vehicle, combined with a load carrying stem and a shock-absorbing coil spring encircling said stem, said stem and spring acting to receive the load for initially compressing the coils of the spring in one direction, and at the same time permitting vibratory action of the spring, and means coöperating with the opposite end of the spring for compressing the coils of the spring in an opposite direction when a pull is exerted due to rebound.

7. A shock-absorber for vehicles comprising upper and lower hanger-irons, means for pivotal attachment of said hanger-irons to the end-portions of the spring-members of the vehicle, combined with a load-carrying and shock-absorbing coil-spring, acting to receive the load for initially compressing the coils of the spring in one direction, and at the same time permitting vibratory action of the spring, said spring being interposed between said hanger-irons, and means coöperating with the opposite end of the spring for compressing the coils of the spring in an opposite direction when a pull is exerted due to rebound.

8. A shock-absorber for vehicles comprising upper and lower hanger-irons, means for pivotal attachment of said hanger-irons to the end-portions of the spring-members of the vehicle, combined with a shock-absorbing means comprising a rod rigidly affixed at one end to one of said hanger-irons, and movably disposed at its other end with relation to the other hanger-iron, and a single coil-spring encircling said rod, means mounted upon said rod acting to receive the load for initially compressing the coils of the spring in one direction, and at the same time permitting vibratory action of the spring, and means also mounted upon said rod and coöperating with said spring for compressing the coils of the spring in an opposite direction when a pull is exerted upon said rod due to rebound.

9. A shock-absorber for vehicles comprising upper and lower hanger-irons, means for pivotal attachment of said hanger-irons to the end-portions of the spring-members of the vehicle, combined with a shock-absorbing means comprising a rod rigidly affixed at one end to one of said hanger-irons, a guide-nut affixed to the other hanger-iron, a sleeve rigidly affixed upon said rod but movably disposed in said guide-nut, a single coil-spring encircling said rod, means mounted upon said rod acting to receive the load for initially compressing the coils of the spring in one direction, and at the same time permitting vibratory action of the spring, and means coöperating with said guide-nut and the said sleeve for compressing the coils of the spring in an opposite direction when a pull is exerted upon said rod due to rebound.

10. A shock-absorber for vehicles comprising upper and lower hanger-irons, means for attachment of said hanger-irons, to the end-portions of the spring-members of the vehicle, rods having a fixed relation to one of said hanger-irons, tubular bosses connected with the other hanger-iron, guide-nuts connected with said tubular bosses, cylinders connected with and extending upwardly from said tubular bosses, guide-nuts upon the upper ends of said cylinders, said rods being movably disposed in said last-mentioned guide-nuts, sleeves movably disposed in said first-mentioned guide-nuts with which the lower portions of said rods are connected, shock-absorbing coil-springs within said cylinders and encircling said rods, and means on said rods for causing said springs to work in opposite directions for checking and absorbing violent reactions.

11. A shock-absorber for vehicles comprising upper and lower hanger-irons, means for attachment of said hanger-irons to the end-portions of the spring-members of the vehicle, rods having a fixed relation to one of said hanger-irons, tubular bosses connected with the other hanger-iron, guide-nuts connected with said tubular bosses, cylinders connected with and extending upwardly from said tubular bosses, guide-nuts upon the upper ends of said cylinders, said rods being movably disposed in said last-mentioned guide-nuts, sleeves movably disposed in said first-mentioned guide-nuts with which the lower portions of said rods are connected, shock-absorbing coil-springs within said cylinders and encircling said rods, and a pair of disks upon each rod with which the end-portions of said coil-springs are in engagement for causing said springs to work in opposite directions for checking and absorbing violent reactions.

12. In combination with the end-portions of the spring-members of a vehicle, a double-acting elastic shock-absorbing shackle, comprising a pair of upper and a pair of lower hanger-irons, perforated ears extending from said hanger-irons for pivotal connection with the shackle-bolts of said spring-members, rods having a fixed relation to said upper hanger-irons, tubular bosses connected with said lower hanger-irons, guide-nuts connected with said tubular bosses, cylinders connected with and extending upwardly from said tubular bosses, guide-nuts upon the upper ends of said cylinders, said rods being movably disposed in said last-mentioned guide-nuts, sleeves movably disposed in said first-mentioned guide-nuts with which the lower portions of said rods are connected, shock-absorbing coil-springs within said cylinders and encircling said rods, and means on said rods for causing said springs to work in opposite directions for checking and absorbing violent reactions.

13. In combination with the end-portions of the spring-members of a vehicle, a double-acting elastic shock-absorbing shackle, comprising a pair of upper and a pair of lower hanger-irons, perforated ears extending from said hanger-irons for pivotal connection with the shackle-bolts of said spring-members, rods having a fixed relation to said upper hanger-irons, tubular bosses connected with said lower hanger-irons, guide-nuts connected with said tubular bosses, cylinders connected with and extending upwardly from said tubular bosses, guide-nuts upon the upper ends of said cylinders, said rods being movably disposed in said last-mentioned guide-nuts, sleeves movably disposed in said first-mentioned guide-nuts, with which the lower portions of said rods are connected, shock-absorbing coil-springs within said cylinders and encircling said rods, and a pair of disks upon each rod with which the end-portions of said coil-springs are in engagement for causing said springs to work in opposite directions for checking and absorbing violent reactions.

In testimony, that I claim the invention set forth above I have hereunto set my hand this 23rd day of September, 1919.

VALDEMAR F. REICH.

Witnesses:
FREDK. C. FRAENTZEL,
S. C. DEIFEL.